United States Patent [19]

Fletcher

[11] Patent Number: 4,944,637

[45] Date of Patent: Jul. 31, 1990

[54] VALVED SEED OUTLET

[76] Inventor: Gilbert K. Fletcher, P.O. Box 527, Emerald, Queensland 4720, Australia

[21] Appl. No.: 393,852

[22] Filed: Aug. 14, 1989

Related U.S. Application Data

[63] Continuation of Ser. No. 100,622, Sep. 24, 1987, abandoned.

[30] Foreign Application Priority Data

Jan. 30, 1987 [AU] Australia .................. PI0110

[51] Int. Cl.⁵ .................................. B65G 53/40
[52] U.S. Cl. ............................ 406/132; 406/135; 239/142
[58] Field of Search ............. 239/142, 654, 655, 681, 239/683, 682, 658; 222/233, 234, 235, 637, 226, 626; 406/127, 128, 132, 135, 134

[56] References Cited

U.S. PATENT DOCUMENTS

| | | | |
|---|---|---|---|
| 793,526 | 6/1905 | Johnson | 406/135 |
| 875,228 | 12/1907 | Witham | 406/135 |
| 1,674,391 | 6/1928 | Donnagan | 406/128 |
| 2,045,862 | 6/1936 | Lavigne | 103/53 |
| 2,048,139 | 7/1936 | Porteous | 406/132 |
| 3,045,840 | 7/1962 | Donelson | 239/684 |
| 3,085,515 | 4/1963 | Workman | 103/176 |
| 3,258,270 | 6/1966 | Ferris | 239/684 |
| 3,437,384 | 4/1969 | Bozich | 406/128 |
| 3,504,945 | 4/1970 | Leibundgut et al. | 406/127 |
| 3,787,149 | 1/1974 | Dane et al. | 417/554 |

FOREIGN PATENT DOCUMENTS

| | | | |
|---|---|---|---|
| 5900969 | 9/1968 | Australia . | |
| 449211 | 8/1927 | Fed. Rep. of Germany | 406/132 |
| 322074 | 10/1934 | Italy | 239/654 |
| 1051228 | 12/1966 | United Kingdom | 222/226 |
| 2069101 | 7/1980 | United Kingdom . | |

Primary Examiner—Andres Kashnikow
Assistant Examiner—Christopher G. Trainor
Attorney, Agent, or Firm—Oldham & Oldham Co.

[57] ABSTRACT

A valved seed outlet is disclosed for use in a seed apparatus for dispensing fluffy or hairy coated seed that is prone to bridging. The valve seed outlet is mounted in an opening of a storage container and comprises mounting structure for mounting the outlet beneath the storage container. A valve seat defines an orifice beneath the storage container through which seed may flow. The valve seat has a valve member mounted therein. The valve member is restrained from rotary motion by at least one support post. The valve seed outlet further has a seed sweep member mounted to disturb the seed at the orifice. The seed sweep member is continuously or intermittently activated. Even further, the valve seed outlet comprises a pair of perpendicular passages using the venturi effect to draw seed through valve aspiration.

7 Claims, 7 Drawing Sheets

VALVED SEED OUTLET

This is a continuation of copending application Ser. No. 07/100,622 filed on Sept. 24, 1987 now abandoned.

THIS INVENTION relates to seeding apparatus, and more particularly to the means by which seed may be fed from a storage hopper to distribution lines.

Various forms of apparatus are known whereby seed is entrained in an air flow and scattered thereby over an area of ground to be seeded, the apparatus being mounted on a suitable vehicle to enable distribution over an extensive area. Seed is held for use in a hopper which is valved to control outflow of seed. It is usual, so as to assist the flow of seed, to pressurize the hopper with air pumped thereto so as to cause a strong flow past the valve at the outlet when the valve is opened. However, it is possible for the seed to become bound at the outlet and so block the flow. This is particularly so with seeds that have a seed coat that is spined or hairy.

An example of the above reference might be made to prior U.S. patent specifications of Weeks (2,723,860); Sherer (2941811) and Johnson (348399).

It is an object of the invention to provide a valved seed outlet which is not subject to becoming blocked by the binding of seed at the outlet. Other objects and advantages of the present invention will hereinafter become apparent.

The invention resides in the provision of a valved seed outlet for use in a seeding apparatus which comprises:

an orifice for the passage of seed from a storage container;

a valve means for selectively blocking the orifice against flow of seed therepast;

seed sweep means for continuous or intermittent agitation of the seed at the orifice operative so as to disturb the seed thereat;

means by which the seed sweep means may be activated;

a first passage to lead seed from a storage container having first and second ends, the orifice being provided at a first end thereof; and a second passage, transverse of the first passage, adjacent the second end thereof, the second passage being operative, in use, with a flow of air therethrough, to draw seed through the orifice by aspiration.

The invention will now be described with reference to a preferred embodiment which is illustrated in the accompanying drawings wherein.

Figure 1:
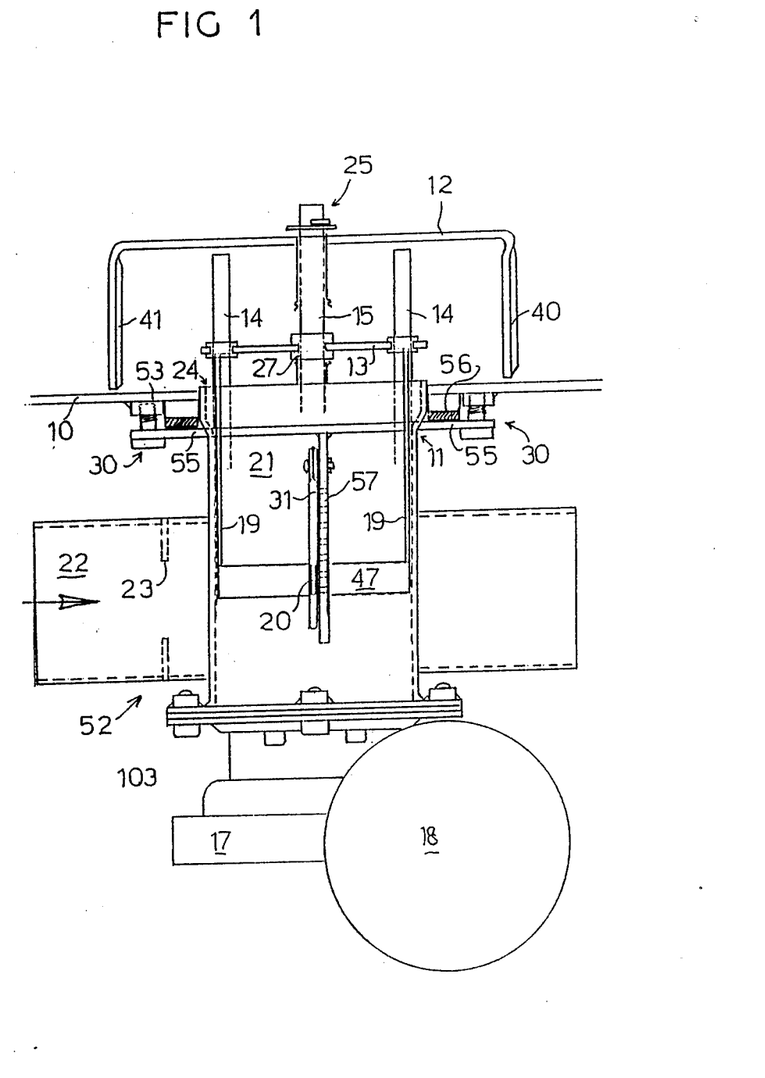
FIG. 1 is a sectional view of a valved seed outlet in accordance with the present invention.
Figure 2:
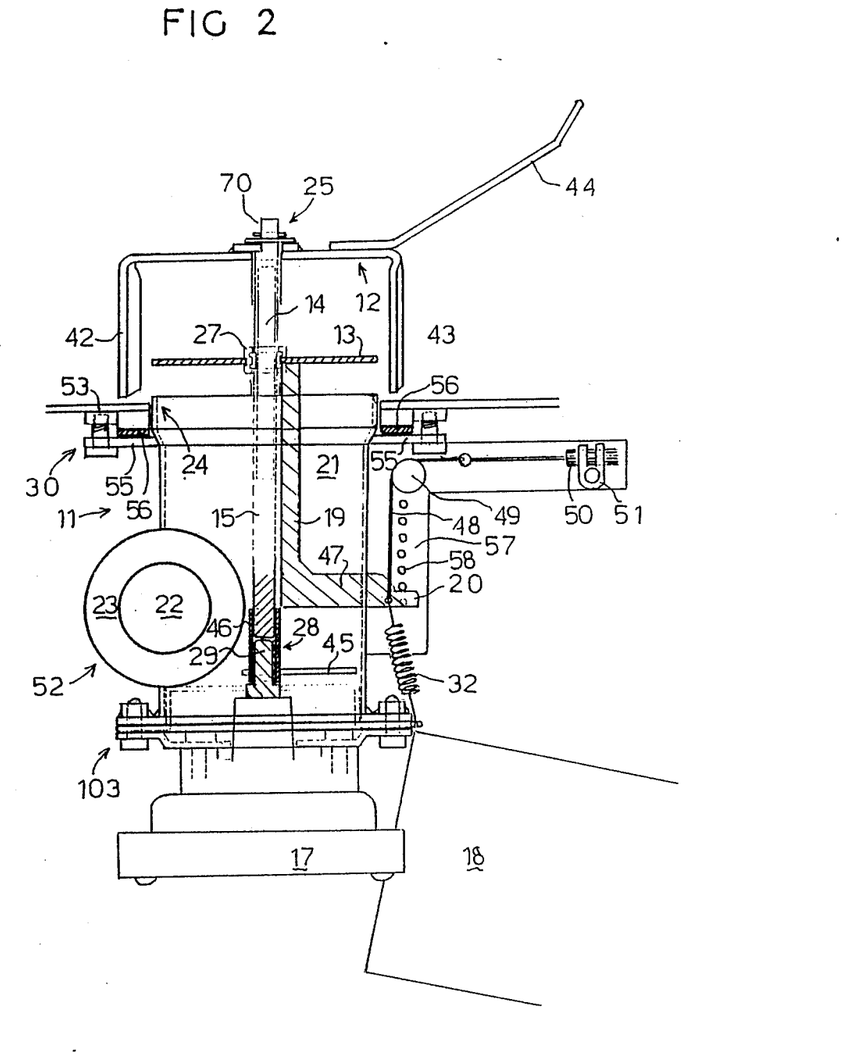
FIG. 2 is a sectional view of the valved seed outlet of FIG. 1 cut perpendicular to the plane of FIG. 1.

In FIGS. 1 and 2, a seed storage hopper 10 is provided with a valved seed outlet 11 having a seed sweep means 12 to disturb seed at the orifice controlled by valve means 13. The seed sweep means is rotatively supported over the valve means 13 as is set out below.

Seed sweep means 12 is mounted upon an axle 15 which can be coupled to a drive motor 18 through a reduction gear box 17 if required. Valve 13 is mounted on a support means 19 which encloses axle 15. Support means 19 is activated by a mechanism acting at 20 to raise or lower the valve means 13 as is described below. The seed outlet from storage hopper 10 leads to a tube 21 which connects with a line 22 along which air is pumped past a suitable constriction such as 23 so as to create a venturi effect, if necessary, at the joint of line 22 with tube 21 so as to draw air and entrained seed from the storage hopper 10 into the line 22. Line 22 is connected to a seed distribution outlet which may be any of the various forms which are now in use.

By utilizing a valved seed outlet of the above type, a pressurized line 22 may be effective to draw seed from hopper 10, which need no longer be constructed for pressurized operation, without the outlet becoming blocked because rotation of the seed sweep means 12 disturbs the seed at the orifice and effectively breaks up any agglomerations of seed that might otherwise bind and bridge over the outlet to block it.

The seed sweep means 12 comprises inverted U-shaped elements being connected to axle 15 at their center. Downwardly depending arms 40 and 41 extend downwardly to a position adjacent the valve seat 24 so as to sweep around the opening created as the valve means 13 is raised. The seed sweep means may be fixed to axle 15 by passing the end 25 of axle 15 through a hole in seed sweep means 12 and locking the parts together with a nut circlip or any suitable means which is effective to hold the seed sweep means on a locking abutment. Various means of interconnecting the respective parts may be adopted here. The axle 15 may be located at its upper end in a bearing means 27, which may be a Teflon bushing in valve plate 13 which is held by support posts 14, which may also be bushed and passed therethrough as shown, and it may be mated at its base 28 to the output 29 of the reduction box 17. Any means of mounting the device may be adopted and what is suitable in any particular application will be largely dictated by the demands imposed by that application. Rather than being removably attached, each of the above parts may be integrally formed or permanently bonded to respective ones of their companion parts as will be possible with plastic moulded parts that, if not mouldable in a single parts, may be welded or adhered together as a fixed composite.

The valve means 13 may be moved relative to its valve seat 24 to open the orifice and meter the seed according to its degree of opening by passing an end of valve support 19 out tube 21 through a slot 31 which permits axial movement. Support 19 may be biased downwardly by any suitable means if required such as spring 32. Various alternate ways of achieving control of valve means 13 will suggest themselves to those skilled in the art.

The sweep means 12 may comprise a number of downwardly dependent arms; the two arms 42 and 43, seen in FIG. 2, closely encircle the valve seat; the two arms 40 and 41 seen in FIG. 1, may be orthogonally positioned relative to the pair 42 and 43, and sweep around a circle of larger circumference; the arm 44 (see FIG. 4) is angled upwardly and is intended to sweep around the conical wall of the hopper (not shown) so as to break up any bridging of seed at higher levels above the level of the valve as can happen with some types of seed. The sweep means may be simply slotted onto the end of drive shaft 15 with complementary locking surfaces acting in respect of rotary motions so that the drive shaft turns the sweep means. Any suitable retainer 25 may be used such as lock nuts, circlips, etc.

The drive shaft 15 may be provided with an arm 45 or arms extended outwardly thereof so as to dislodge any seed that may build up in chamber 21 opposite passage 22. The drive shaft may be simply keyed at end 46 onto the output shaft 29 of gear box 17.

The valve means 13 may be a simple circle of plate material, centrally holed and bushed at 27 for passage of shaft 15 so that the plate 13 may move vertically off valve seat 24. The valve plate may be retained in place by support posts engaged in notches in the plate periphery (see FIG. 3) or passed therethrough (see FIGS. 1 and 2) to prevent rotary movement whilst allowing sliding vertical movement therealong. The underside of the valve is engaged by two opposed, peripherally disposed, downwardly dependent arms 19 which join at their base 47 to support actuator 20 which protrudes through slot 31. Actuator 20 may be engaged by a filament 48 passed over pulley 49 from sheath 50 clamped at 51 to provide a remote operation using the standard cable actuated technique. Other means such as mechanical linkages of the lever arm type might equally be employed. Alternatively electrical or fluid pressure actuators might be used. A plate 57 with a series of holes 58 beside slot 31 provides a means to limit the movement of the valve means 13. A stop may be fitted to a hole 58 to block the vertical movement of actuating arm 20.

The main body 52 of the seeding apparatus may be coupled to the base 53 of a hopper by connecting means such as bolts at 30 engaging lugs 55, with a seal 56 between the hopper base and a flange around the main body 52.

The downwardly dependent arms of the sweep means may have a flat form in cross section with an angle applied to them to increase the rate of flow of seed to the valve. Thus, instead of being tangential to the circle about which they are made to track, they are offset from that by a few degrees so as to push seed to the valve. Any number of arms might be used, 2, 4, 6, 8, etc. to increase their effect.

Figure 3:
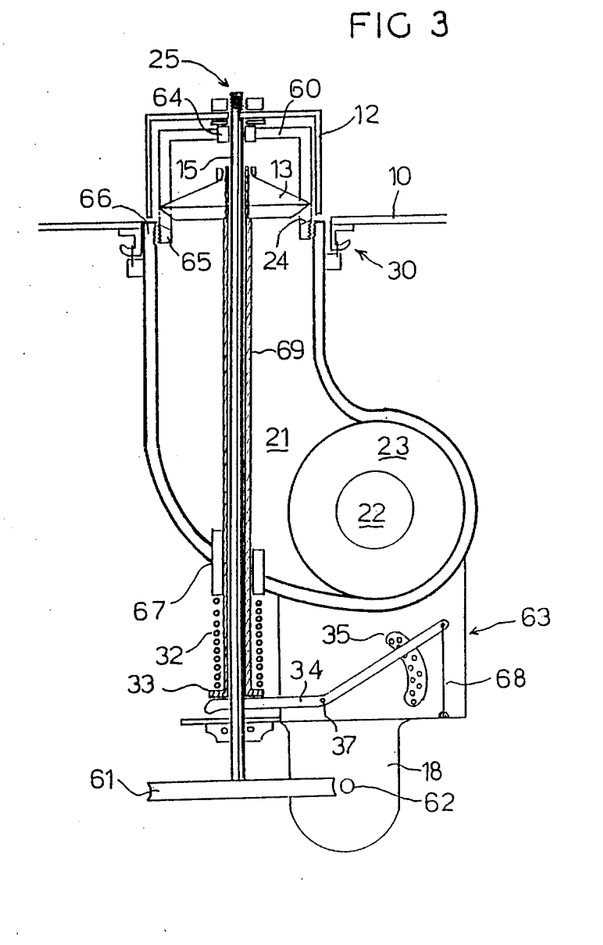
FIG. 3 is a sectional view of another valved seed outlet in accordance with the present invention.

FIG. 3 shows an alternate form of a valved seed outlet, similar in some respects to that of FIGS. 1 and 2, with like integers numbered identically.

In FIG. 3 a seed storage hopper 10 is provided with a valved seed outlet having a seed sweep means 12 to disturb seed at the orifice controlled by valve means 13. The valve sweep means is rotatably supported over the valve means 13 upon a bridge means 60.

Seed sweep means 12 is mounted upon an axle 15 which is provided with a drive wheel 61 coupled to a worm gear 62 on the output shaft of a drive motor 18. Valve 13 is mounted on a support tube 69 which encloses axle 15. Support tube 69 is activated by a mechanism 63 to raise or lower the valve means 13 as is described below. The seed outlet from storage hopper 10 leads to a tube 21 which connects with a line 22 along which air is pumped past a suitable constriction 23 so as to create a venturi effect at the joint of line 22 with tube 21 so as to draw air and entrained seed from the storage hopper 10 into the line 22. Line 22 is connected to a seed distribution outlet which may be any of the various forms which are now in use.

The axle 15 is located at its upper end in a bearing means 64 in support bridge 60 which may be screw threaded at its base 65 so as to be removably fitted to pipe end 66.

The valve means 13 may be moved relative to its valve seat 24 to open the orifice and meter the seed according to its degree of opening by passing valve support tube 69 out tube 21 through a bearing surface 31 which permits axial movement. Support tube 69 is biased downwardly by action of spring 32 acting on end plate 33 which may be moved upwardly, against the action of spring 32, by lever 34. Lever 34 is pivoted at 37 and activated by tension on cable 68. So as to limit the degree of travel of lever 34, and valve means 13, a stop plate 35 may be provided with a means whereby the degree of travel may be adjustably set, so as to vary the rate of feed of seed. Various alternate ways of achieving control of valve means 13 will suggest themselves to those skilled in the art.

Figure 4:
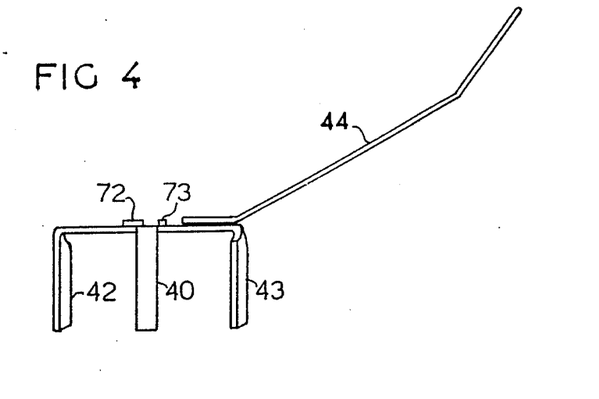
FIG. 4 is a view of a sweep arm which may be used in the valved seed outlets of FIGS. 1 to 3.

In the embodiment of FIGS. 1 and 2, the bottom of tube 21 has been provided with a removable floor plate 103. This allows the floor to be repositioned when different size pressurized lines 22 are used to suit different fans. In practice, the floor should line up with the lower joint between passages 21 and 22 so that seed build up is reduced. In FIG. 3, the two passages 21 and 22 are formed integrally and the passage 21 can be merged with 22 with a smooth curve to prevent build up. A D.C. motor 18 and reduction box 17 can be mounted on the floor plate which might be changed to suit various models of motors. Typically, motors turning at 25 rpm might be used. The number of sweep arms in assembly 12 may be varied so as to compensate for the different speeds of available motors and/or, the reduction gear box parameters might be selectively altered. As a simple means of attachment, the axle 15 and reduction box output 29 may be locked together by insertion therethrough of a pin which doubles as the sweep arm 45. The sweep arm assembly of FIG. 4 is fitted to axle 15 with a simple keyway formed by a flat face 70 cut into the side of the shaft (see (FIG. 2) with a complementary mating hole in the top of the sweep assembly or a round hole with flat plate 72 thereover (see FIG. 4). A further plate 73 (see FIG. 4) enables a flat washer to ride thereon for the retaining means (locking pin, circlip, etc.) to engage against.

The above described valved seed outlet may be used with a variety of fan types, both low pressure and higher pressure fans. Fans typically available are low pressure trash fans which convey material therethrough and the medium pressure fans as used on commercial grain air seeders which cannot pass material therethrough. Different pneumatic circuits are possible to accommodate these different fans. Generally, the trash fan is robust and lower in price.

Figure 5:
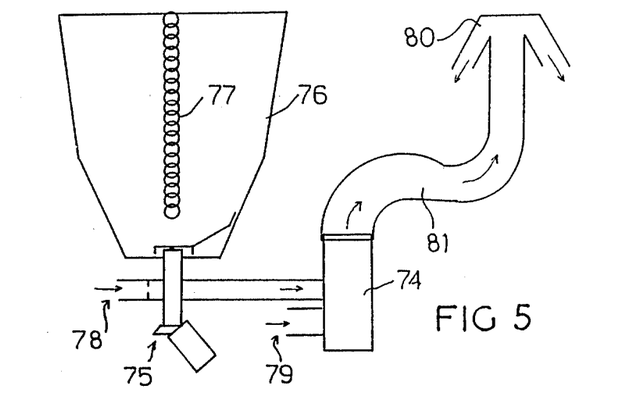
FIGS. 5 to 9 illustrate various pneumatic circuit arrangements whereby a valved seed outlet, in accordance with the present invention, may be put into practice.
Figure 6:
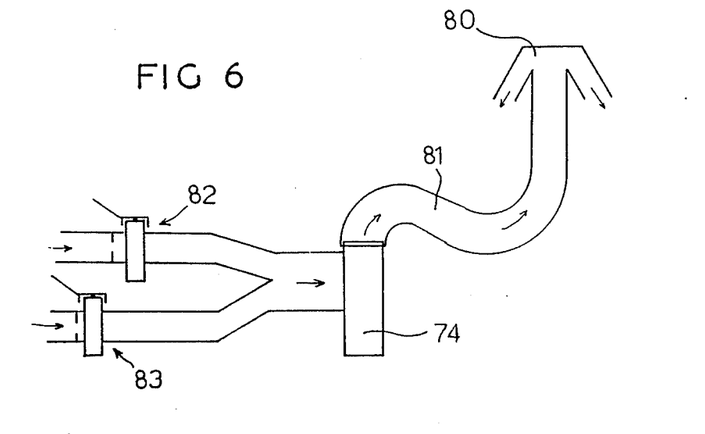

FIGS. 5 and 6 show circuits employing a trash-fan 74. In FIG. 5, fan 74 is connected to valved seed outlet 75 at the bottom of hopper 76 provided with a chain 77 hung from above to swing above the outlet so as to break up any high level bridging of seed as may occur with seeds such as buffel grass. The valve 75 is on the suction side of the fan, air being drawn in at 78 to entrain seed which is passed through fan 74 to a distributor 80 via tubing 81. An inlet 79 may be added where the system's requirement for air is greater than what may be drawn through inlet 78. This arrangement is suitable for seeds such as buffel grass which are not damaged by the fan. The venturi restriction may be used in this arrangement. Such a unit may be mounted on a trayback vehicle or bulldozer, etc., to spray seed over a short distance from the vehicle. A number of hoppers may feed the same distributor and in FIG. 5, two valved seed outlets are connected via fan 74 to distributor 80 to allow accurate metering of different seed sizes which may separate by vibrations when mixed in one hopper.

Figure 7:
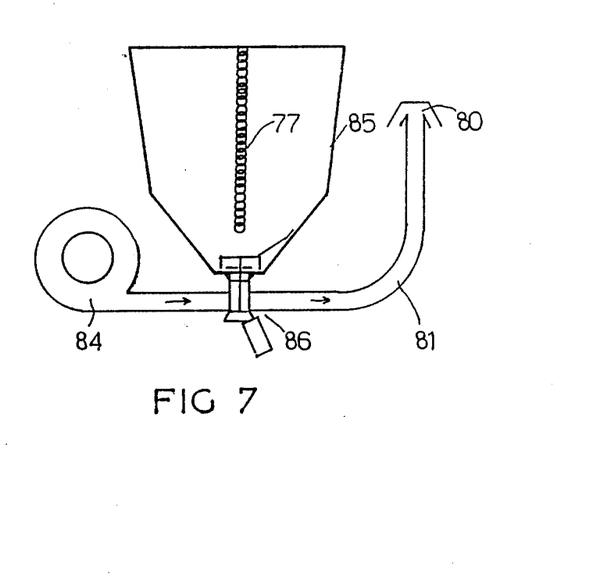
Figure 8:
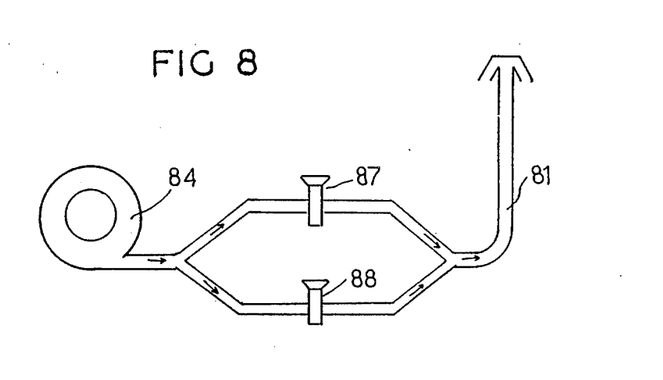
Figure 9:
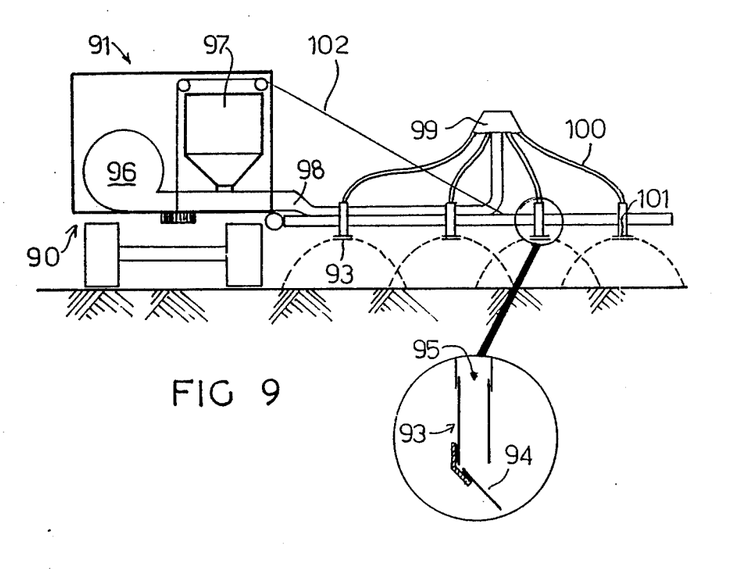
Figure 10:
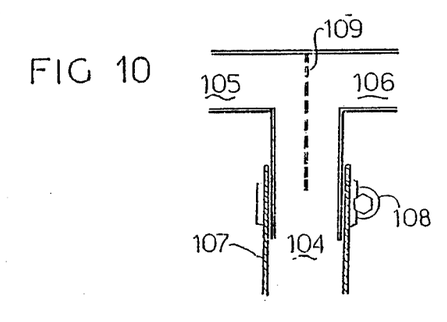
FIGS. 10 and 11 show an equalizer/divider mechanism that may replace the distributor of FIG. 9.
Figure 11:
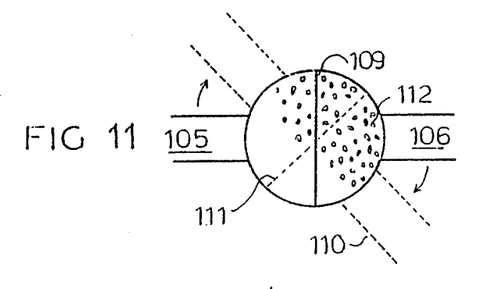
Figure 12:
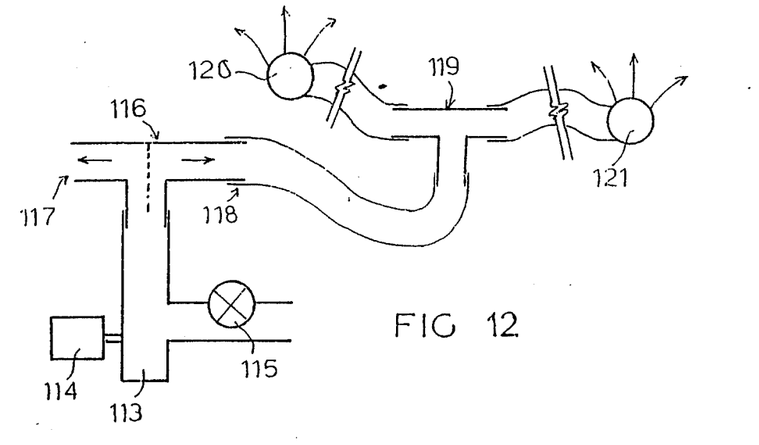

FIGS. 7 and 8 show how a medium pressure fan 84, which may not pass the seed therethrough, may feed seed from hoppers to distributor 80. In FIG. 7, fan 84 is connected to push air past outlet 86, to entrain seed, and pass it to distributor 80 via tube 81. In FIG. 8, the fan 84 pumps air past two distributors 87 and 88 to entrain a selected one of seed from two hoppers, or from both hoppers together. Such a circuit is successful with all grass seeds as well as grain seeds such as millet. Millet is damaged if passed through a trash fan. The benefit of using the medium pressure fans is that any type of seed may be transported much further and with longer transport possible, typically to 25meters, systems may feed distributors on the large blade ploughs now in use to control tree sucker regrowth.

The above valved seed outlet is ideal for drawing seeds into the inlet of a trash fan where a certain volume of air can bypass the valve. When positioned on the outlet side of a fan, the total volume of air must pass the outlet, or outlets, and, to accommodate this air, the passage 22 may need to be enlarged depending on the size of the fan. This may mean that the length of passage 21 and axle 15 would have to be increased. An alternative is to split the outlet air and bypass a portion around the valve, but the problem then arises of reintroducing the lower pressure air (after the venturi), plus seeds, back into the main airstream.

FIG. 9 shows how the complete system may be set up. A vehicle 90 carries a seeding apparatus 91 and a boom 92 which may be supported off to one side on stay 102 which may also pull the boom upwardly when necessary. Boom 92 carries spreaders 93 which have a deflection plate 94 to fan the flow out pipe 95 to spread the seed. Other spreaders might be employed. Fan 96 entrains seed in hopper 97 to carry it along line 96 to distributor 99 which, via lines such as 100, feed the spreaders (such as 101).

With the device of the above character, it is possible to feed seed to a distribution head which might be any of the known mechanisms whereby seed is disseminated. Any form of power source may be applied to the seed sweep arm, electric, hydraulic, and even manual activation might be provided for. In some applications, a spring might be wound so as to provide the means by which the seed sweep is activated. Where a number of seeds are to be sewn simultaneously, a plurality of hoppers may be used, one per seed type, each with an outlet of the above character, the respective air streams being combined to feed the seed mix thereby created to a distribution head.

FIGS. 10 and 11 illustrate how an equalizer/divider means might be structured to perform the function of the distributor 99 of FIG. 9. In FIG. 10, a T-piece junction is formed with a passage 104 connected to receive the airflow from the seed valve, joining passages 105 and 106 whereby air entrained seed may be fed off in two opposed directions. The T-piece is mounted into tubing 107 and clamped therein by clamp 108 which, when loosened, allows the T-piece to be rotated so as to adjust the flow as set out below. Within the T-piece is a fixed division 109. FIG. 11 shows the equalizer/divider in plan view. In practice, it is found that the flow of seed along a tube is not uniformly distributed across some sections of the tube. In cross-section, a seed distribution pattern such as indicated at 112 may occur. If this be so at the T-piece, then the quantity of seed flowing out passage 106 will exceed that out of 105. So as to overcome this problem, the T-piece may be rotated to a position 110 (shown in dotted outline). To further ensure an equal division of the flow, the divider 109 splits the flow even more effectively, it having the disposition 111 when at the properly adjusted position.

FIG. 12 shows a circuit wherein two of the seed equalizers are employed. Air is pumped to the circuit by a fan at 113, driven by a motor at 114, to draw seed from a valve at 115. Their output is divided at 116 into two streams 117 and 118. A second seed divider 119 may feed distributors 120 and 121. Three equalizer/dividers are required for 4 outlets, 7 for 8, etc. The equalizers may be calibrated by fitting mesh cylinders, starting with the equalizer closest to the fan so as to be able to determine what the flow patterns are at each point.

Devices such as those described above might be mounted on bulldozers so that reseeding may be most conveniently achieved in land reclamation with seeding taking place along with soil working operations. The device might be applied to hoppers employed in aircraft etc., the device being a substitute for existing units wherever they occur. The system may be mounted on 4×4 farm vehicles to allow more accurate seeding of smaller areas than possible using aerial seeding. Aerial is expensive and requires large areas to be economical.

The slow action of the sweep coupled with the action of the vacuum allows uncleaned buffet seed to be used through the valve as the sweep deflects the trash while the seed is separated. Many cattlemen now collect their own seed and would not have to clean the seed if the valved seed outlet is used.

Whilst the above has been described with reference to a specific embodiment, it will be clear that many variations and modifications may be made thereto that are within the scope and spirit of the present invention.

I claim:

1. A valved seed outlet to be used in a seed apparatus to dispense fluffy or hairy coated seed that is prone to bridging wherein a storage container with walls contoured to lead seed therein gravitationally to an opening is used, the valved seed outlet being mounted in said opening of said container, said valved seed outlet comprising:

a body part with a first passage therethrough to lead seed from the storage container, the first passage having first and second ends;

the first end being provided with a mounting means thereat whereby the valved seed outlet may be mounted beneath said storage container at said opening therein externally of the container;

a valve seat at the first end defining an orifice by which seed may flow from said storage container;

a valve means mounted for operative movement orthogonal to the valve seat within the container, said movement achieved by a valve support disposed into the first passage from the lower surface of the valve means, said movement regulating a flow area into the orifice, said flow area being defined by the separation between the outer circumference of the valve seat and the outer circumference of the valve means, so that the flow of seed past the orifice is metered by the position of the valve means and the flow of seed is stopped when the valve means engages the valve seat to block the orifice, said valve means being restrained from rotary motion by at least one support post firmly affixed to the body part of said valve seed outlet;

seed sweep means rotatively mounted to disturb seed at the orifice;

means by which the seed sweep means may be continuously or intermittently activated;

a second passage, transverse to the first passage adjacent the second end thereof, the second passage being operative, in use, with a flow of air therethrough to draw seed through the orifice by aspiration, the second passage being restricted in size adjacent the first passage to increase aspiration utilizing the venturi effect; and the seed sweep means being operative to disturb seed at the orifice, the seed sweep means including at least a first set of depending arms to sweep closely around the periphery of the valve and its valve seat.

2. A valved seed outlet as claimed in claim 1 wherein:
the first passage has a shaft axially therethrough;
a motor is mounted at the second end to rotate the shaft; and
the seed sweep means is mounted to the shaft for rotation therewith.

3. A valved seed outlet as claimed in claim 2 wherein the shaft is provided with a sweep arm mounted radially thereon adjacent the second end to sweep around the second end of the first passage.

4. A valved seed outlet as claimed in claim 2 wherein;
the valve means is a plate with the shaft passed therethrough, the valve means being axially slidable therealong;
the valve means being attached to a valve support by which the valve means can be selectively moved between a closed position and a range of degrees of openness.

5. A valved seed outlet as claimed in claim 4 wherein the valve support has an arm extending outwardly through a slot in the first passage whereat a resilient means biases the valve means to a closed position and a mechanism is provided whereby the valve means may be opened by displacement of the arm.

6. A valved seed outlet as claimed in claim 1 wherein the seed sweep means comprises a number of dependent arms that sweep circularly around the orifice, the arms being flattened in a plane at a substantial angle to the tangent to their line of motion to sweep seed to the orifice.

7. A valved seed outlet as claimed in claim 6 wherein an additional sweep arm extends upwardly to disturb seed above the level of the orifice.

* * * * *